June 18, 1940.  E. E. WOODWARD  2,204,639
GOVERNOR MECHANISM
Filed Dec. 8, 1934

Inventor:
Elmer E. Woodward
By
Wilson, Dowell, McCanna & Wintercorn
Attys.

Patented June 18, 1940

2,204,639

UNITED STATES PATENT OFFICE 2,204,639

GOVERNOR MECHANISM

Elmer E. Woodward, Rockford, Ill., assignor to Woodward Governor Company, Rockford, Ill., a corporation of Illinois Application December 8, 1934, Serial No. 756,609

6 Claims. (Cl. 170—163)

This invention relates to governor mechanisms and more especially to a novel form of governor mechanism which has found particular utility as applied to the control of controllable pitch propellers. The improved governor mechanism herein disclosed is adapted to be utilized in a propeller pitch control system to provide not only for the desired "low gear" for take-off and climb purposes and "high gear" for maximum speed and economy in level flight, but also continuous variation of pitch in flight as varying conditions require, whereby to keep the engine turning uniformly at its rated R. P. M. and power output.

In the past, one of the most widely used controls provided only two pitch settings—a low pitch for take-off and climb, and a high pitch for level flight. That control was semiautomatic in that engine oil pressure was used only to move the blades to low pitch position, and, when the pilot operated a valve after attaining the desired attitude, the blades were shifted to high pitch position by centrifugal counterweights. Obviously, the low pitch and high pitch settings had to be selected to suit average conditions, which meant a compromise on efficiency. The usual range of adjustment was about 5½°. The controls more recently developed, one of which employed an electric motor for driving a worm and gear pitch adjustment, were aimed apparently at providing for greater efficiency by increase and decrease of pitch between the two extremes, but so far as I am aware, such controls have not been practical because of their complicated construction and hence high cost, and their necessarily large proportions and heavy weight, which are serious criticisms in the case of an airplane appliance. Moreover, these later controls were not, I understand, as responsive to varying flight conditions as could be desired.

The principal object of my invention is to provide a governor which is so designed and constructed to avoid the objections noted with regard to these previous controls when utilized in a propeller pitch adjustment system, the same being substantially as simple as the earlier two-pitch control but providing a greatly increased range of adjustment—about 12°—and weighing a small fraction of the weight of the later controls mentioned, and being instantaneously responsive to changes in flight conditions so as to keep the engine turning uniformly at its rated R. P. M. and power output.

In accordance with the present invention, a relay valve is provided having a plunger therein movable in one direction under spring pressure and in the other direction by engine oil pressure, and a pilot valve, controlled by centrifugal weights responsive to changes in speed of the engine, regulates the pressure active upon said plunger so as to keep the same in a balanced position only so long as the speed of the engine remains constant. The plunger, in the event of decrease in speed of the engine, is moved in one direction by build-up of oil pressure to supply oil to the working cylinder to decrease the pitch of the propeller and accordingly speed up the engine. On the other hand, in the event of an increase in speed of the engine, the plunger moves in the other direction in response to a drop in oil pressure so as to allow escape of oil from the working cylinder and thus permit the centrifugal counterweights to increase the pitch of the propeller and accordingly lower the speed of the engine.

A special feature of my invention lies in the provision of manually controllable spring means in connection with the centrifugal weights that automatically shift the pilot valve, whereby to change to a higher or lower critical engine speed by increasing or decreasing the spring loading upon said weights, thus a higher speed may be selected for take-off and climb and a lower speed for cruising, the higher speed being at or slightly above the rated R. P. M., and the other speed somewhat lower. A further feature of the manual control for the spring means lies in its usefulness as a safety attachment to operate the pilot valve manually in the event the parts stick or bind and fail to function automatically, the pilot being enabled to operate the pilot valve either to decrease or increase the pitch of the propeller at will. A further feature in this connection lies in the provision of an emergency exhaust port which may be uncovered by the pilot valve in the event the regular restricted port becomes clogged. The likelihood of clogging, however, is reduced to an absolute minimum by reason of the fact that the pilot valve slides crosswise with respect to the restricted port and hence tends to clear away any foreign particles that might otherwise lodge there.

The invention is fully described hereinafter by reference to the accompanying drawings, in which—

The same reference numerals are applied to corresponding parts in these views.

Figure 1:
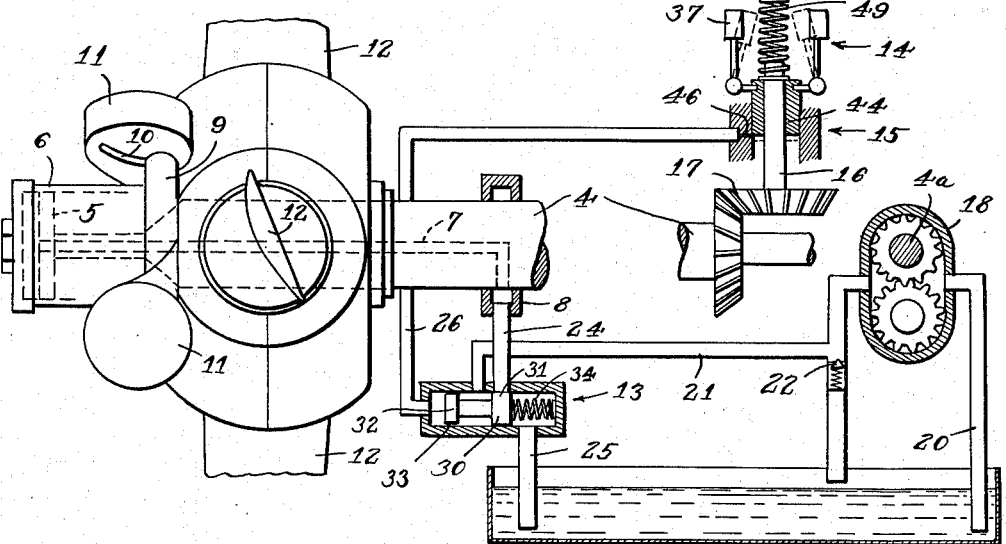
Figure 1 is a hydraulic circuit of the propeller pitch control system showing all of the parts more or less diagrammatically.

Referring to Fig. 1, 4 is the crank shaft on the forward end of which a piston 5 is mounted, received in a working cylinder 6 arranged to reciprocate relative to the piston. Forward movement of the cylinder is secured by supplying oil under pressure through the passage 7 provided in the crank shaft extending from a collector ring 8 forwardly through the piston 5, as indicated. The cylinder has substantially tangential arms 9 projecting therefrom working in cam slots 10 on the counterweights 11 attached to the blades 12 of the three-bladed propeller in the well known way, whereby to turn the three blades to a position of less pitch in the forward movement of the cylinder, each of the counterweights being moved inwardly toward the crank shaft axis. Contrariwise, when oil is allowed to escape from the cylinder 6 through the passage 7 so that the cylinder 6 is free to move rearwardly, the counterweights 11 move outwardly away from the crank shaft axis under centrifugal force and accordingly cause the blades 12 to move to a higher pitch position. In other words, the cylinder 6 and piston 5 form a single-acting hydraulic motor which is biased in one direction by the counterweights 11 but arranged to move in the opposite direction under oil pressure. With the two-pitch control referred to above, adjustable stops were usually provided in the cam slots to predetermine low pitch and high pitch positions, usually about 5½° apart. It was customary to provide a three-way valve to be operated by the pilot to control the propeller, and in one position it admitted oil under pressure from the main pressure supply of the engine through the collector ring 8 and passage 7 to the cylinder 6, to move the cylinder forwardly and thereby move the blades 12 to low pitch position, and in the other position it allowed oil to escape from the cylinder 6 so as to allow the counterweights 11 to move the blades into high pitch position.

In accordance with the present invention, the stops referred to are retained but set so as to allow a wider range of pitch adjustment, usually about 12°, or more, and the three-way valve is replaced by a main control valve 13, hereinafter referred to as the relay valve. The valve 13 seals the cylinder 6 to maintain a certain pitch adjustment, but is arranged to move to a position to admit oil to said cylinder in the event the engine slows down, whereby to decrease propeller pitch and allow the engine to speed up again to a normal speed. In the event of an increase in engine speed, the valve is arranged to move to allow drainage of oil from the cylinder 6 whereby to permit increase of propeller pitch and accordingly lower the speed of the engine back to normal. The relay valve, in other words, functions to decrease or increase propeller pitch to balance the power output of the engine and maintain uniform speed. A governor or speed responsive mechanism is indicated generally by the numeral 14, which, in its speeding up or slowing down in accordance with changes in speed of the engine, adjusts an auxiliary control valve 15, hereinafter referred to as the pilot valve, whereby to affect the relay valve 13 so as to produce the required change in propeller pitch. The governor is suitably driven in proportion to the engine speed. In this case 16 is the drive shaft for the governor 14, driven, as indicated at 17, directly off the crank shaft 4. 18 is a gear pump, the driving shaft 4a of which may be an extension of the crank shaft 4 or a jack shaft geared to the crank shaft, so that the pump 18 is driven continuously in the operation of the engine to pump oil or any other suitable working fluid from the sump 19 through a pipe 20 and deliver it at a substantially constant pressure through a pipe 21 to the relay valve 13. Constant pressure is secured by providing a spring loaded relief valve 22 in the line 21 discharging into the sump 19.

Figure 2:
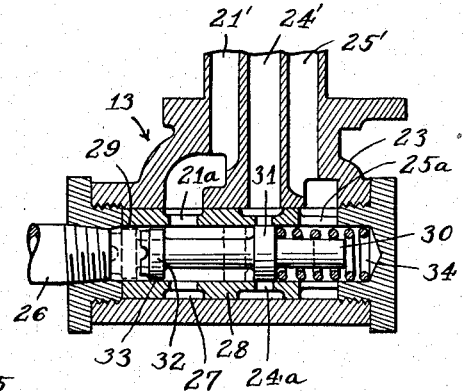
Fig. 2 is a longitudinal section through the relay valve.

The main control or relay valve 13 is illustrated in Fig. 2 and comprises a body 23 having a passage 21' for communication with the pipe 21, another passage 24' for communication with the pipe 24, and a third passage 25' for communication with the exhaust pipe 25. A fourth pipe 26 communicates with one end of the longitudinal bore 27 in the body 23 in which a bushing 28 is fitted, as shown, having ports 21a, 24a, and 25a communicating with the passages 21', 24' and 25', respectively. The open end of the bore 29 in the bushing 28 communicates with the pipe 26. A plunger type valve member 30 is reciprocable in the bore 29 and has two annular enlarged portions 31 and 32; the portion 31 has a close working fit in the bore, whereas the portion 32 has a certain small amount of clearance, as shown at 33, for the purpose of allowing oil leakage past the portion 32 toward the pipe 26 at a predetermined rate. A clearance of approximately .007" is provided, and the total area of opening thus afforded is somewhat less than the area of the leakage or exhaust port 46 to which reference will be made later, the purpose being to insure that when the port 46 is fully uncovered, oil can escape through the port 46 faster than it by-passes at 33, whereby to insure movement of the plunger 30 under those circumstances to the left under action of the spring 34. The coiled compression spring 34 is seated in the closed end of the bore 29 and bears against the portion 31 of the plunger 30 and normally tends to move it to the other end of the bore, as indicated in dotted lines. The pressure of the spring 34 is, however, arranged to be balanced by oil pressure on the plunger 30 to keep the port 24a closed, and thus prevent escape of oil from the cylinder 6, whereby to keep the blades 12 at a certain adjusted pitch. When the plunger 30 is allowed to move to the left by reason of the oil pressure being reduced and overcome by the spring pressure, the port 24a is placed in communication with the port 25a and oil is allowed to flow through the pipe 24 out through the pipe 25 to the sump. On the other hand, when the oil pressure is built up and overcomes the spring pressure so that the plunger 30 moves to the right, the port 24a is thrown into communication with the port 21a and oil under pressure is delivered from the pipe 21 through the pipe 24 to the cylinder 6.

Figure 3:
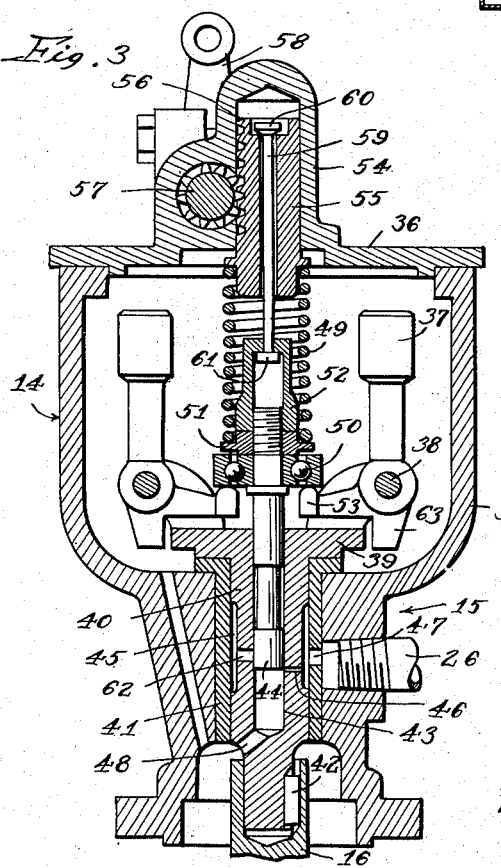
Fig. 3 is a central vertical section through the pilot valve and governor employed in connection therewith.

The auxiliary control or pilot valve 15 is illustrated in Fig. 3 along with the governor 14. The latter comprises a cup-shaped housing 35 having a cover 36 to close the chamber in which the weights 37 are revolved. The weights are mounted on pivots 38 on a revolving head 39 which has a cylindrical neck 40 rotatably received in a bushing 41 and detachably connected at its lower end, as at 42, with the driving shaft 16, previously mentioned. The neck 40 forms the rotary body for the valve 15, and has a longitudinal bore or throat 43 in which the non-rotatable valve plunger 44 is received with a close working fit. The neck 40 is reduced, as at 45, so that the previously named port 46 that is arranged to be closed more or less by the end of the plunger 44, will at all times be kept in communication with the pipe 26 through a port 47 in the bushing 41 to allow oil to be discharged from the pipe 26 into the bore 43 at a rate determined by the position of the plunger 44 with respect to the port 46. The lower end of the bore 43 is open, as indicated at 48, for discharge of the oil to the sump. The plunger 44 is normally urged downwardly by a coiled compression spring 49 so as to cover the port 46, but is arranged to be moved upwardly by the weights 37 to uncover the port 46, more or less, according to the position of the weights, which in turn is determined by the speed of the engine. A ball bearing 50 is carried on the upper end of the plunger 44 with its inner race clamped to the plunger by a ring 51 and nut 52, the ring 51 forming a seat for the lower end of the spring 49, as shown. The weights 37 have fingers 53 which bear against the outer race of the bearing 50. With this construction, it is obvious that the head 39 and weights 37 are free to revolve relative to the plunger 44 and spring 49, and that the plunger will move against the action of the spring when the weights are thrown outwardly under centrifugal force. The fact that the plunger 44 is reciprocable in a relatively rotating ported body 40 minimizes friction in the operation of the pilot valve and makes the governor mechanism more responsive, so that it operates without objectionable "hunting." Hunting results from the necessity for the governor mechanism to build up sufficient force to overcome friction in the operated parts to move the same, and hence, when the friction between these parts is reduced to a minimum, it follows that the mechanism is more responsive and will maintain much closer regulation of engine speed.

The cover 36 has a hollow cylindrical boss 54 in which a plunger 55, bearing on the upper end of the spring 49, is slidable. The plunger has rack teeth 56 formed in one side thereof, and a pinion 57 meshes with said rack and is arranged to be turned by means of a lever 58 oscillated manually through a suitable push-pull cable (not shown) connected with a knob or control lever operated by the pilot in the cockpit, or pilot's compartment. Depression of the plunger 55 obviously increases the spring pressure upon the plunger 44 so that a higher engine speed is required to move the weights 37 outwardly to bring the plunger 44 to a given position, and vice versa. This control furthermore enables the pilot to move the plunger 44 downwardly positively in the event the spring 49 does not exert sufficient pressure to overcome a tendency on the part of the plunger to stick or bind in the bore 43. A pin 59, extending through the plunger 55, has heads 60 and 61 at its opposite ends, the head 61 being received in a chamber in the nut 52 on the upper end of the plunger 44. This headed pin does not interfere in any way with depression of the plunger 55 or raising thereof to a certain limit, but serves to provide a positive connection between the plunger 55 and the plunger 44 to enable the pilot to positively raise the plunger in the event it sticks and the weights 37 fail to move the same. It is apparent, therefore, that while the governor serves to automatically operate the pilot valve 15 the pilot can at any time adjust the governor manually to change to a higher or lower critical engine speed, and in the event of a mechanical trouble arising in the governor, the pilot can manipulate the valve 15 by hand in either direction.

The port 46 controlled by the plunger valve 44 is necessarily restricted and might possibly become clogged, even though there is a tendency to avoid clogging by reason of the manner in which the plunger 44 cooperates with the port, moving crosswise with respect to the end thereof and tending to clear away any foreign particles that might otherwise tend to collect. An additional emergency relief port is therefore provided in the neck 40, as at 62, above the level of the regular port 46. In the event the port 46 becomes clogged, thereby causing the engine to speed up, as will soon appear, the plunger 44 will uncover the port 62 and thus avoid excessive speeding of the engine. The projections 63 on the pivot portions of the weights 37 are arranged to engage the head 39 to limit their throw so that they will not come in contact with the housing 35.

In operation, when the engine is started, the weights 37 turn at such a slow speed that the plunger 44 is not raised sufficiently to uncover the port 46. The plunger 30 is furthermore in the extreme left-hand dotted position (Fig. 2), owing to the fact that there is little or no oil pressure to overcome the action of the spring 34. However, the pump 18, supplying oil through the port 21a, quickly builds up pressure to the left of the portion 32 of the plunger 30, owing to the fact that the port 46 is closed and there is no outlet for the oil by-passing at 33. The pressure builds up to a point where the plunger 30 is backed up against the action of spring 34 sufficiently to place the port 24a in communication with port 21a, whereupon oil is delivered under pressure through the pipe 24 to the cylinder 6 to move the blades 12 to a position of less pitch. The engine, therefore, speeds up, the load thereon being lessened. As the engine speeds up, the weights 37 move outwardly under centrifugal force and raise the plunger 44 so as to uncover the port 46, at least to a certain extent. Now, since oil can escape through the port 46, the pressure to the left of the plunger 30 drops and the plunger is accordingly moved to the left under the action of the spring 34 and closes the port 24a so as to lock the blades 12 in their adjusted position. So long as the oil pressure on the plunger 30 balances the spring pressure thereon, the plunger will remain in the full line position shown in Fig. 2, and the propeller blades will accordingly stay at whatever pitch they have been given. Such a balance exists when the load on the engine is balanced against the power output of the engine so that the speed remains uniform at a given throttle setting. If, due to a change in attitude of the ship in flight, let us say into a dive, the load upon the engine is decreased and it accordingly tends to speed up, the weights 37 moving outwardly under centrifugal force raise the plunger 44 and allow oil to escape at a higher rate, thus lowering the pressure to the left of the plunger 30 sufficiently for the spring 34 to move the plunger to the left and thus uncover the port 24a and allow oil to escape from the cylinder 6. The counterweights 11 thereupon immediately move the blades 12 to a position of increased pitch, and accordingly bring the engine speed back to normal. The plunger 30 quickly resumes its position covering the port 24a when the speed of the engine drops back to normal and the plunger 44 cuts down the rate of flow of oil through the port 46 back to the normal rate. The engine is, therefore, kept from excessive speeding under the circumstances, and advantage is taken in the dive to increase the pitch of the propeller to a point where the load balances the power output of the engine, and the most efficient economical operation is secured.

Now, on the other hand, if the ship again levels off so that the load upon the engine is increased, that is reflected in a decrease in engine speed, so that the weights 37 move inwardly and allow the spring 49 to move the plunger 44 downwardly to cut down, if not entirely cut off, the flow of oil through the port 46. This results in an increase in pressure to the left of the plunger 30, and the plunger accordingly moves to the right against the action of the spring 34 so that oil from the pipe 21 is supplied through the pipe 24 to the cylinder 6 so as to decrease the propeller pitch and allow the engine to speed up back to normal. Here again, the plunger 30 immediately resumes its normal balanced position covering the port 24a just as soon as the engine regains its normal speed where the oil pressure to the left of the plunger 30 balances the spring pressure. If the ship goes into a climb so that the load upon the engine is further increased, the drop in engine speed will cause a further automatic adjustment of the blades 12 to a position of still less pitch, so that the engine may regain its normal speed. In a multi-motored ship, the failure of one engine imposes greater load on the other engine or engines and, under those circumstances, the slowing down results in an automatic change in the propeller pitch similarly as above described. It is also obvious that the pitch is also automatically changed to suit the air encountered, so that the engine speed remains constant. Under all circumstances, therefore, the engine is operated at its peak efficiency—turning uniformly at its rated R. P. M., the propeller pitch being always adjusted so that the load balances the power output. The "normal" speed, or what I have above referred to as the "critical" speed, everything else being equal, depends upon the pressure exerted by the spring 49—with a light spring pressure, the weights 37 can move outwardly under centrifugal force more readily than with a heavy spring pressure, and accordingly a lower critical speed goes with light spring pressure, and a higher critical speed with heavy spring pressure. The pilot can adjust the spring pressure to suit conditions by merely manipulating the lever 58. Ordinarily, the spring pressure will be increased for take-off purposes, because under those circumstances, or for that matter in any steady climb, the engine should be operated at a speed at or somewhat above its rated R. P. M. for best efficiency. On the other hand, the spring pressure may be lessened for cruising, because under those circumstances the engine will ordinarily be operated at or somewhat below its rated R. P. M. The adjustment of the lever 58 by push-pull cable control from the cockpit is attended to by the pilot very easily. This same control serves as a safety, inasmuch as it enables the pilot to positively move the plunger 44 one way or the other in the event the weights 37 fail to move the plunger upwardly, or the spring 49 fails to move the plunger downwardly. The port 62 also serves as a safety, as explained before, in the event of clogging or undue restriction of the port 46. There is, therefore, nothing apt to get out of order seriously and give rise to a hazard for the pilot in the operation of his ship, because the automatic means provided can, at will, be converted into a manual control if the desired performance is not secured.

It is believed the foregoing description conveys a good understanding of the objects and advantages of my invention. While I have disclosed my invention as applied to a hydraulically operated pitch adjusting mechanism, it must be remembered that mechanical and electrical mechanisms are also used, and I do not limit the application of my invention to the hydraulic type. I may, for example, employ a working cylinder in connection with a mechanical mechanism and control the propeller pitch otherwise in the same manner as above described, by controlling the admission and exhausting of oil or other fluid to and from the working cylinder. Similar adaptations will readily suggest themselves for the electrical mechanisms. Furthermore, while the control system is herein described as applied to aircraft propellers, it will readily appear that the invention is adapted to control internal combustion engines similarly in the propulsion of other craft, or anything to be driven. The appended claims have therefore been drawn with a view to covering all legitimate modifications and adaptations.

I claim:

1. In a governor control system for a fluid operated servo-motor or the like, the combination of a pump, a fluid operable relay valve in fluid circuit with said pump and the associated servo-motor, said valve being normally stationary to seal the fluid circuit to the associated servo-motor and maintain the same in a selected position of adjustment, said valve having a fluid leakage port and being movable one way when fluid is allowed to leak freely therefrom through said port and movable the other way when leakage is restricted or stopped, a pilot valve for regulating or shutting off the leakage, a governor device operatively connected with said valve to move the same, said governor device including counteracting spring means, manually operable means for adjusting said spring means, said manual means being arranged to operate said pilot valve in extreme adjustment thereof, and said pilot valve being provided with a secondary leakage port arranged to be uncovered in the extreme movement of said pilot valve.

2. In a governor control system for a fluid operated servo-motor or the like, the combination of, a relay valve for controlling the flow of fluid to the servo-motor and embodying a cylinder and a piston assembly reciprocable therein, said piston assembly including two spaced lands, means acting on one end of said piston assembly for constantly urging the same in one direction, means for supplying pressure fluid to the interior of said cylinder at a point intermediate said lands during the normal movement of said piston assembly, means including an outlet port in said cylinder positioned to be controlled by one of said lands for diverting pressure fluid from the interior of said cylinder to the associated servo-motor, means including a pilot valve for controlling the exhaust of pressure fluid from the end of said cylinder adjacent the opposite end of said piston assembly, a governor device for actuating said pilot valve, said piston being constructed to limit the escape of pressure fluid past said other land to a rate of flow substantially less than the capacity of said pilot valve.

3. In a governor control system for a fluid operated servo-motor or the like, the combination of, a relay valve embodying a cylinder and a piston reciprocable therein, means for supplying pressure fluid to said cylinder to urge said piston in one direction, means for constantly urging said piston in the opposite direction, means operable under the control of said piston for diverting pressure fluid directly from said cylinder to an associated servo-motor or the like in response to movement of said piston from a predetermined position under the influence of the opposed forces thereon supplied by said first two named means, means including a pilot valve for controlling the exhaust of pressure fluid from said cylinder to regulate the fluid pressure on said piston, and a governor device for actuating said pilot valve.

4. In combination with a controllable pitch propeller having a range of pitch adjustment between fixed limit stops, hydraulic means for changing the pitch of said propeller, a valve controlling said hydraulic means, a governor responsive to the speed of the propeller for actuating said valve in one direction, a spring for actuating said valve in opposition to said governor, and manual means operatively connected with said valve having a neutral position in which said valve is under the control of said governor and said spring, said manual means being operable to hold said valve in either limiting position against the action of said governor or said spring to retain said propeller at the corresponding end of said pitch adjustment range.

5. In a governor control system for a fluid operated servo-motor, the combination of a source of pressure fluid, a valve for receiving pressure fluid from said source and having an exhaust outlet and a port leading to said servo motor, a piston in said valve urged in one direction under the pressure of fluid from said source and adapted when in one position to close said port, said piston being movable from such position in said one direction to permit the flow of fluid from said source to said port and in the opposite direction to permit the flow of fluid from said motor through said port and outlet, spring means yieldably urging said piston in said last mentioned direction, a governor, and means controlled by the governor to variably control the pressure in said valve opposing the action of said spring whereby the pressure maintained in said motor is regulated in accordance with speed changes detected by said governor.

6. In a governor control system for a fluid operated servo-motor or the like, the combination of a relay valve embodying a casing and a member reciprocable therein, means for supplying pressure fluid to said casing, said fluid acting on said member to create a pressure urging the member in one direction, constantly acting means urging said member in the opposite direction, one portion of said member being a piston part of a valve means for diverting pressure fluid directly from said casing to an associated servo-motor or the like in response to movement of the member by the resultant of said opposing forces, and a governor controlled pilot valve cooperating with said member in regulatably controlling the force exerted by said fluid on said member.

ELMER E. WOODWARD.